United States Patent [19]

Brophy

[11] Patent Number: 5,173,746

[45] Date of Patent: Dec. 22, 1992

[54] METHOD FOR RAPID, ACCURATE MEASUREMENT OF STEP HEIGHTS BETWEEN DISSIMILAR MATERIALS

[75] Inventor: Chris P. Brophy, White Bear Township, Ramsey County, Minn. 55110

[73] Assignee: Wyko Corporation, Tucson, Ariz.

[21] Appl. No.: 703,457

[22] Filed: May 21, 1991

[51] Int. Cl.⁵ .............................................. G01B 9/02
[52] U.S. Cl. ......................................... 356/357; 382/8
[58] Field of Search ............... 356/358, 357, 359, 360, 356/351; 382/8, 28

[56] References Cited

U.S. PATENT DOCUMENTS 4,639,139 1/1987 Wyant et al. ....................... 356/359

Primary Examiner—Samuel A. Turner
Assistant Examiner—Richard Kurtz
Attorney, Agent, or Firm—Cahill, Sutton & Thomas

[57] ABSTRACT

A computerized phase shifting interferometer operates interactively with a user to correct surface profile data of a sample containing a film of material which is optically dissimilar to the material of a substrate. Profile data is measured, and optically dissimilar areas of the sample are identified by differences in measured height. The user is prompted to enter optical parameters for each identified area into the computer. Then the user is prompted to enter a best guess of the film thickness. A Newton approximation technique is performed by the computer to produce subsequent guesses of the film thickness until a computed thickness increment is below a predetermined value.

9 Claims, 2 Drawing Sheets

METHOD FOR RAPID, ACCURATE MEASUREMENT OF STEP HEIGHTS BETWEEN DISSIMILAR MATERIALS

BACKGROUND OF THE INVENTION

The invention relates to optical interferometers, such as the assignee's WYKO TOPO optical profiler, and more particularly to improvements that allow rapid, accurate determination of step heights between dissimilar materials having different phase change on reflection.

Although optical profilers have the advantage of being non-contact instruments, they have the drawback that they record errors in height variation across boundaries of different materials if the "optical phase change on reflection" varies across such boundaries.

An optical interferometric profiler encounters difficulties in accurately profiling surface height of a specularly reflecting surface having distinct areas of optically dissimilar materials. Optically dissimilar materials may be defined as materials (or material systems) that have a significantly different Fresnel phase change on reflection. Such phase changes on reflection lead to errors in the interferometrically determined height profile across boundaries of the dissimilar materials. More specifically, when light is reflected from a specularly reflecting test surface and interferes with light in a reference beam of an interferometer, the modulation or visibility of the interference fringes depends on the optical constants, e.g., the complex index of refraction, of the test surface materials. The interferometrically measured phase of the fringe pattern includes the phase change on reflection, which is a property of the optical constants of the reflecting material. In optical profilometry, optically dissimilar materials are those which produce a different phase change on reflection. For example, all dielectric (zero absorption) materials are optically similar, although they have different real refractive indices. The complex index of refraction is given by the term $n_c = n - ik$, where n is the real part that indicates the amount of deflection of a ray of light passing through the material, and k is the imaginary part that indicates the amount of absorption.

The above-mentioned WYKO TOPO optical profiler marketed by the assignee readily measures or profiles surfaces of a sample material composed of a single material. The relative change in measured optical phase is related solely to the change in surface height of the sample, by the equation $$\Delta \Psi = \Delta h(4\pi/\lambda).$$

In the case of a sample composed of a single material, the above equation yields a very accurate measurement of surface height variation.

A problem occurs, however, when measuring samples with two or more dissimilar materials contained in the same field of view. While the variation in measured height is accurate within each area of a particular material, an error in measured height occurs across boundaries between dissimilar materials within the field of view due to the above-mentioned different phase change on reflection. The "measured" height change is given by the formula $$\Delta h_{measured} = \Delta h_{true} + \epsilon,$$

where $\epsilon = \Delta \Phi \lambda / (4\pi)$. In the above equation, $\Delta h_{true}$ is the actual height change and $\Delta \Phi$ is equal to $\Phi 1 - \phi 2$, $\Phi 1$ and $\Phi 2$ being the optical phase changes on reflection of the two dissimilar materials.

There is a presently unmet need for a technique to rapidly and accurately determine the height difference between areas of optically dissimilar materials within a field of view of an interferometer.

SUMMARY OF THE INVENTION

It is an object of the invention to provide an improvement in an optical interferometer which allows utilization of the interferometer to rapidly and accurately determine the height of a step between optically dissimilar materials within a field of view of an interferometer.

Briefly described, and in accordance with one embodiment thereof, the invention provides a technique and structure for operating a computerized phase shifting interferometer to accurately determine a thickness of a film of a first material on a substrate of a second material. The height of the sample is measured at each pixel within a field of view that includes a first area of the film and a second area of the substrate. The first area and the second area are identified from the measured heights as the areas including pixels with measured heights which fall within first and second ranges, respectively. The user then is prompted to enter first and second optical constants for the first and second materials, respectively, into a computer of the interferometer. The user then is prompted to enter a first guess value for the height difference. A phase change on reflection for the film is computed using the first and second optical constants and the first guess value. A measured height difference between the heights of the film and the substrate is computed from the measured heights. An error is computed from the measured height difference, the first guess value, and the computed phase change on reflection. A derivative of the error is computed from the present guess value, a previous guess value, the present error, and a previous error. A height increment value is computed from the present error and the derivative. The present guess value is selected as the thickness of the film if the height increment value is less than a predetermined error. The height increment value is added to the present guess value to produce another present guess value if the height increment value is not less than the predetermined error, and the foregoing procedure is repeated with the new present guess value.

DETAILED DESCRIPTION OF THE PREFERRED EMBODIMENT

Figure 3:
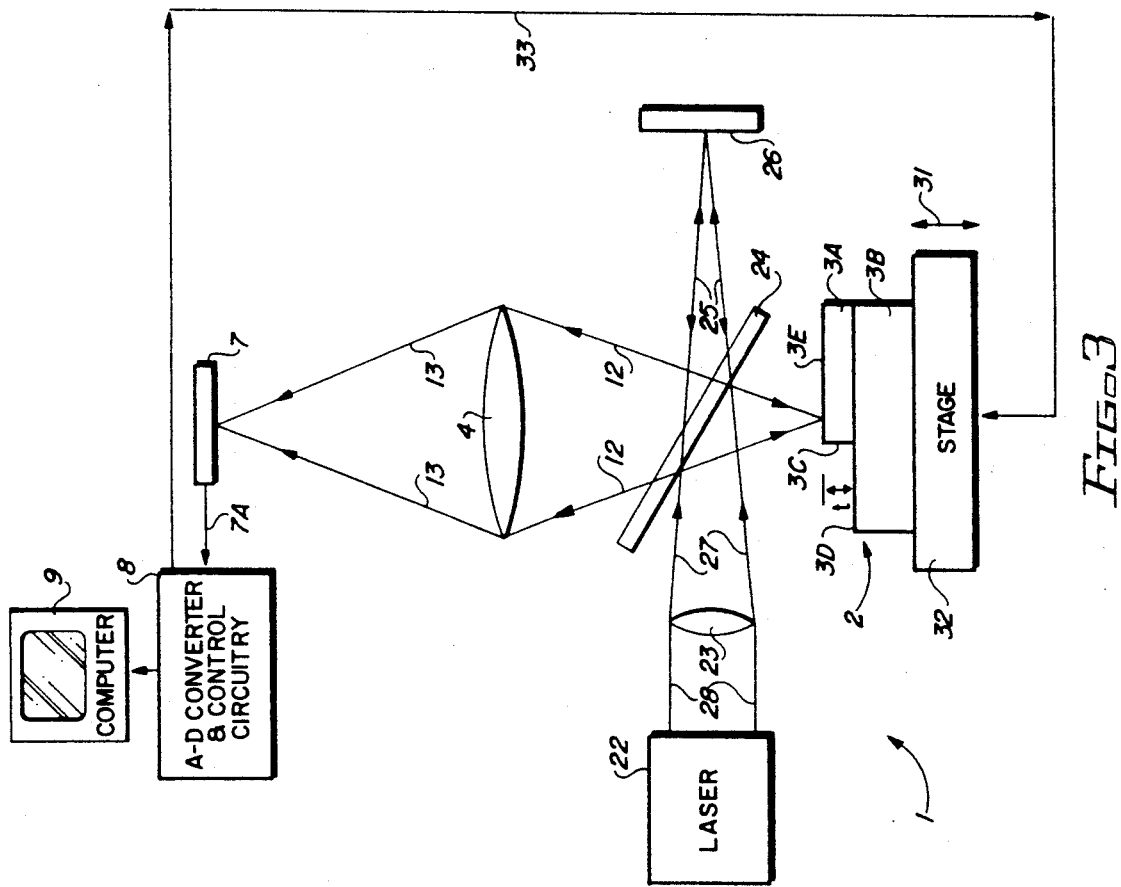
FIG. 3 is a block diagram of an optical interferometer containing the improvement of the present invention.

Referring first to FIG. 3, the generalized block diagram shows a state-of-the-art automatic optical profiling interferometer 1, such as the assignee's WYKO TOPO profiling interferometer. Interferometer 1 includes a light source 22 that generates a collimated beam 28 which is directed to lens 23. Lens 23 focuses beam 28 into beam 27, through a beamsplitter 24, and onto a reference mirror 26. Beamsplitter 24 reflects part of beam 27 onto a sample 2 being measured. Sample 2 includes a film 3A of a first material, such as silicon dioxide, and a substrate 3B of a second material, such as silicon. A step 3C is formed between silicon surface 3D and silicon dioxide surface 3E.

Sample 2 is mounted on a stage 32, which is movable in the direction of arrows 31 by means of a piezoelectric transducer (not shown). The piezoelectric transducer is controlled in response to signals on conductors 33 generated by control circuitry in block 8. The control circuitry in block 8 is controlled in response to computer 9. Alternately, the optical path difference could be varied by mounting reference mirror 26 on a piezoelectric transducer and shifting it in response to the control signals on conductors 33.

The beam reflected from the surface of sample 2 passes upward through beamsplitter 24, as indicated by rays 12. The beam reflected by reference mirror 26 is reflected upward by beamsplitter 24, as also indicated by rays 12. The beam reflected by reference surface 26 and the beam reflected by the surface of sample 2 along the path indicated by numeral 12 produces an interference pattern. The interference pattern is focused by lens 4 to a photosensitive array 7. The scanning of photosensitive array is controlled by control circuitry in block 8. Photosensitive array 7 produces signals 7A that are digitized by analog-to-digital conversion circuitry in block 8 and input to computer 9, which stores the resulting intensity data and computes the phase and surface height of the sample 2 in accordance with well-known techniques.

The phase change on reflection from a generally absorbing, single-layer film on a generally absorbing substrate is given by the expression $$\phi(t) = \tan^{-1}\left[\frac{-2Im(Y)}{1-|Y|^2}\right]. \quad (1)$$

where Y is a complex number referred to as the "admittance of the material", Im(Y) is the imaginary part of that number, and is given by the expression $$Y = n_c\text{(film)}\frac{n_c\text{ (substrate)}\cos(\beta) + i^*n_c\text{ (film)}\sin(\beta)}{n_c\text{ (film)}\cos\beta + i^*n_c\text{ (substrate)}\sin(\beta)}, \quad (1\text{-A})$$

where $$\beta = \frac{2\pi n_c\text{ (film)}t}{\lambda}. \quad (1\text{-B})$$

Note that the phase change on reflection is a strongly dispersive function of $\lambda$ when the film thickness t is appreciable. In general, phase changes from single-layer films can be much larger than phase changes from substrates. More discussion of the above equations can be found in "Thin Film Optical Filters", Chapter 2, by H.A. MacLeod, McMillan, New York, 1986.

It should be noted that the technique of the present invention assumes that the thickness of the film 3A (FIG. 3) is constant, and there is no step in the substrate at the film boundary.

Figure 1:
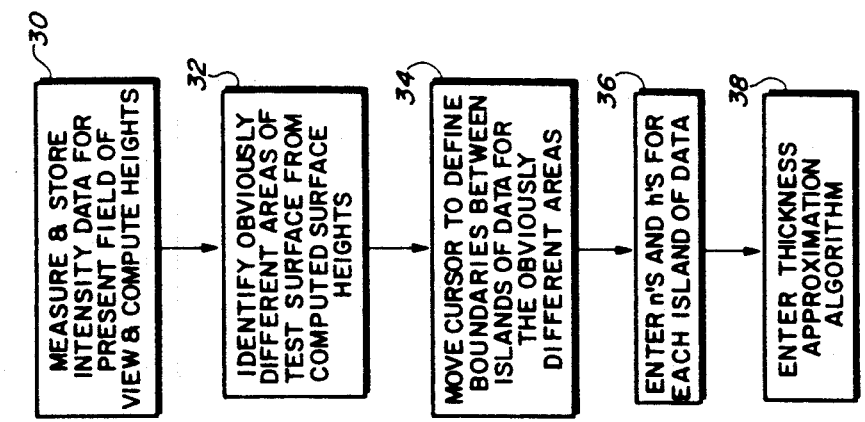
FIG. 1 is a flowchart of an algorithm executed by the computer of the interferometer shown in FIG. 3.

Referring to FIG. 1 and in accordance with the technique of the present invention, interferometer 1 of FIG. 3 is used in a conventional manner to measure the intensity of all pixels within the present field of view, store the resulting intensity data, and compute the phase and the corresponding sample surface height at each pixel. As indicated in the flowchart of FIG. 1 by block 30, this operation is performed using interferometer 1, which can be the above-mentioned WYKO TOPO interferometer.

The next step, indicated in block 32, is for the user to display the computed height data over the area previously measured, and identify "obviously different" areas of the test surface from the computed surface heights. In the present embodiment of the invention the program divides the full range of measured heights into 16 equal subranges, and indicates which of these ranges the computed surface heights fall into.

As indicated in block 34, the next step in the process is for the user to move a cursor or use other interactive technique to delineate the boundaries between the "obviously different" islands of data. If convenient, the data along those boundaries can be "invalidated" as one way to enable the software to easily recognize the boundaries of the islands of data.

Figure 2:
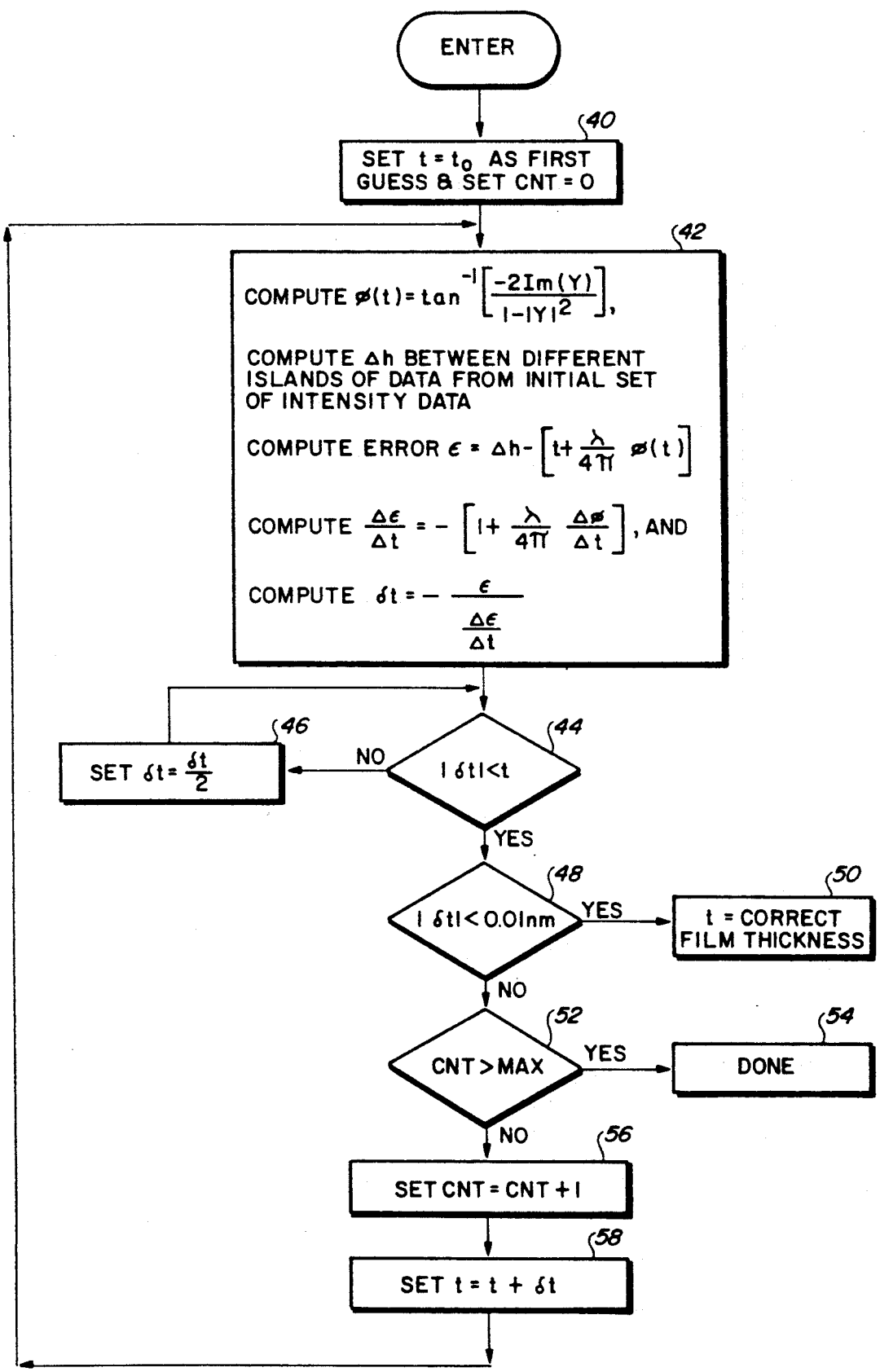
FIG. 2 is a flowchart of an algorithm for determining the step height between dissimilar materials in accordance with the present invention.

Next, as indicated in block 36, the user enters, via a keyboard or other input device, the n's and k's of the complex index of refraction for each "obviously different" area or island of data, as indicated in block 36. Next, as indicated in block 38, the program in computer 9 goes to a subroutine, the flowchart of which is shown in FIG. 2. This subroutine carries out a Newton procedure for finding the root of a function. Block 40 sets the film thickness t at an initial value $t_0$ as a first "guess" of the film thickness. The subroutine also sets a software counter variable CNT to zero in block 40 of FIG. 2. The subroutine then goes to block 42 and performs a number of computations, including computing $\phi(t)$, the phase change on reflection, according to equation (1) above. Then, the subroutine computes $\Delta h_{measured}$ between the different islands of data identified in accordance with blocks 32 and 34 of FIG. 1 from the initial set of data that was measured earlier in accordance with block 30 of FIG. 1.

The subroutine then computes the error $\epsilon$ according to the equation $$\epsilon = \Delta h_{measured} - \left[t + \frac{\lambda}{4\pi}\phi(t)\right]. \quad (2)$$

Where $\epsilon$ is the error in the initial guess of the value of (t).

Next, the subroutine computes the derivative of the error with respect to time, in accordance with the equation $$\frac{\Delta\epsilon}{\Delta t} = -\left[1 + \frac{\lambda}{4\pi}\frac{\Delta\phi}{\Delta t}\right]. \quad (3)$$

Next, the subroutine computes an increment in film thickness t for computing the next "guess" at the thickness t of film 3A according to the equation $$\delta t = \epsilon/-(\Delta\epsilon/\Delta t) \quad (4)$$

The subroutine then goes to decision block 44 and determines if the absolute value of $\delta t$ is less than the initial guess t. If this determination is negative, the subroutine goes to block 46 and reduces the value of $\delta t$ by fifty percent to "dampen" the amount by which t is incremented in block 58, and re-enters decision block 44.

If the determination of decision block 44 is affirmative, the subroutine goes to decision block 48 and determines if the absolute value of δt is less than 0.01 nanometers. It this determination is affirmative, then the present guess of the film thickness t is correct to within 0.01 nanometers, which is acceptably accurate. The program then goes to block 50, and accepts t as the correct thickness of film 3A.

If the determination of decision block 48 is negative, the subroutine goes to decision block 52 and determines if the software counter variable CNT is greater than a maximum count. If this determination is affirmative, the program halts, as indicated in block 54. (If the initial guess is too far off, the subroutine does not work properly and may "stagnate". A value has to be arbitrarily selected to make the subroutine stop in the event this happens.) The user can make a determination whether to accept the most recent value of t as a sufficiently accurate determination of the thickness of film 3A.

If the determination of decision block 52 is negative, the program goes to block 56 and increments CNT, and then goes to block 58 and increments t by the amount δt to produce a new guess at the value of t. The subroutine then re-enters block 42 and makes the above-described computations for a new guess at the value of t.

The foregoing technique for generating improved guesses is an adaptation of the well-known Newton approximation technique.

It should be appreciated that the above-described invention provides for the first time a technique, using a modern automatic interferometer, for rapidly, accurately obtaining step heights of a film of a first material on a substrate of an optically dissimilar second material. There is strong commercial motivation to provide such a device, because profiling step heights on surfaces of integrated circuits is a very important class of measurement needed by the semiconductor industry. The described invention obviates the prior art expedient of coating the entire sample surface including optically dissimilar materials with a thin single-material coating, and then optically profiling the surface of the coating to determine the profile of the underlying surface with the optically dissimilar materials. This prior art technique is very time-consuming and expensive, and usually involves placing the sample in a vacuum chamber and evaporating a thin coating of metal on it. This technique renders the sample unusable, which also is undesirable.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method of operating an interferometer to measure a thickness of a film of a first material on a substrate of a second material, comprising the steps of:
   (a) supporting the substrate with the film thereon on a stage of the interferometer;
   (b) measuring the height of the sample of each pixel within a field of view of the interferometer including a first area of the film and a second area of the substrate;
   (c) identifying the first area from the measured heights as the area including pixels the measured heights of which exceed the measured heights of other pixels by a predetermined value;
   (d) entering first and second material constants for the first and second materials, respectively, into a computer of the interferometer;
   (e) entering a first guess value for the height difference into the computer;
   (f) computing a phase change on reflection for the film using the first and second material constants and the first guess value;
   (g) computing a measured height difference between the heights of the film and the substrate from the measured heights;
   (h) computing an error from the measured height difference, the first guess value, and the computed phase change on reflection;
   (i) computing a derivative of the error from the present guess value, a previous guess value, the present error, and a previous error;
   (j) computing a height increment value from the present error and the derivative;
   (k) selecting the present guess value as the thickness of the film if the height increment value is less than a predetermined error; and
   (l) adding the height increment value to the present guess value to produce another present guess value and repeating steps (f) through (k) if the height increment value is not less than the predetermined error.

2. The method of claim 1 wherein step (b) includes categorizing the measured heights into various non-overlapping ranges, and identifying the first area as an area containing pixels the measured heights of which fall into a first range, and identifying the second area as an area containing pixels the measured heights of which fall into a second range.

3. The method of claim 2 wherein the first and second material constants include the indexes of refraction of the first and second materials, respectively.

4. The method of claim 3 wherein step (e) includes computing the phase change on reflection according to the equation $$\phi(t) = \tan^{-1}\left[\frac{-2Im(Y)}{1 - |Y|^2}\right].$$

step (g) includes computing the error according to the equation $$\epsilon = \Delta h_{measured} - \left[t + \frac{\lambda}{4\pi}\phi(t)\right],$$

where t is the present guess value, Δh is the measured height difference computed in step (f), step (h) includes computing the derivative according to the equation $$\frac{\Delta\epsilon}{\Delta t} = -\left[1 + \frac{\lambda}{4\pi}\frac{\Delta\phi}{\Delta t}\right],$$

where Δφ is the difference between a present value of φ(t) and a previous value of φ(t), and Δt is the difference between a present value of t and a previous value of t, and step (i) includes computing the height increment according to the equation $$\delta t = \epsilon / - (\Delta \epsilon / \Delta t)$$

5. The method of claim 4 wherein step (c) includes prompting a user to enter the first and second material constants, and step (d) includes prompting a user to enter the first guess value.

6. In an interferometer, means for accurately determining a thickness of a film of a first material on a substrate of a second material, comprising in combination:
   (a) a support in the interferometer supporting the substrate;
   (b) means for measuring the height of the sample of each pixel within a field of view f the interferometer including a first area on the film and a second area on the substrate;
   (c) means for identifying the first area from the measured heights as the area including pixels the measured heights of which exceed the measured heights of other pixels by a predetermined value;
   (d) means for entering first and second material constants for the first and second materials, respectively, into a computer of the interferometer;
   (e) means for entering a first guess value for the height difference into the computer;
   (f) means for computing a phase change on reflection for the film using the first and second material constants and the first guess value;
   (g) means for computing a measured height difference between the heights of the film and the substrate from the measured heights;
   (h) means for computing an error from the measured height difference, the first guess value, and the computed phase change on reflection;
   (i) means for computing a derivative of the error from the present guess value, a previous guess value, the present error, and a previous error;
   (j) means for computing a height increment value from the present error and the derivative;
   (k) means for selecting the present guess value as the thickness of the film if the height increment value is less than a predetermined error; and
   (l) means for adding the height increment value to the present guess value to produce another present guess value if the height increment value is not less than the predetermined error.

7. A method of measuring a step height between a surface of a first material of a test sample and a surface of an adjacent second material of the sample, comprising the steps of:
   (a) supporting the substrate with the film thereon on a stage of an interferometer;
   (b) operating the interferometer to measure the height of the sample of each pixel within a field of view including a first area of the first material and a second area of the second material;
   (c) identifying the first area from the measured heights as the area including pixels the measured heights of which exceed the measured heights of other pixels by a predetermined value;
   (d) entering first and second material constants for the first and second materials, respectively, into a computer of the interferometer;
   (e) entering a first guess value for the height difference into the computer;
   (f) computing a phase change on reflection for the film using the first and second material constants and the first guess value;
   (g) computing a measured height difference between the height of the surface of the first material and the height of the surface of the second material from the measured heights;
   (h) computing an error from the measured height difference, the first guess value, and the computed phase change on reflection;
   (i) computing a derivative of the error from the present guess value, a previous guess value, the present error, and a previous error;
   (j) computing a height increment value from the present error and the derivative;
   (k) selecting the present guess value as the thickness of the film if the height increment value is less than a predetermined error; and
   (l) adding the height increment value to the present guess value to produce another present guess value and repeating steps (f) through (k) if the height increment value is not less than the predetermined error.

8. A method of measuring a thickness of a film of a first material on a substrate of a second material, comprising the steps of:
   (a) placing the substrate with the film thereon on a stage of an interferometer;
   (b) operating the interferometer to measure the intensities of all pixels in a field of view of the interferometer including a first area on the film and a second area on the substrate;
   (c) storing the measured intensity data;
   (d) computing a phase and a corresponding sample surface height at each pixel of the first area on the film and the second area on the substrate;
   (e) displaying the computed sample surface heights;
   (f) visually identifying the first area on the film from the measured heights as an area including pixels the measured heights of which exceed the measured heights of other pixels by a predetermined value, the other pixels being in the second area on the substrate;
   (g) grouping the identified heights of the first area on the film separately from the identified heights of the second area on the substrate;
   (h) entering first and second material constants for the first and second materials, respectively, into a computer of the interferometer;
   (i) entering a first guess value for the height difference between the film and the substrate into the computer;
   (j) computing a phase change on reflection for the film using the first and second material constants and the first guess value;
   (k) computing a measured height difference between the heights of the film and the substrate from the measured heights;
   (l) computing an error from the measured height difference, the first guess value, and the computed phase change on reflection;
   (m) computing a derivative of the error from the present guess value, a previous guess value, the present error, and a previous error;
   (n) computing a height increment value from the present error and the derivative;

(o) selecting the present guess value as the thickness of the film if the height increment value is less than a predetermined error; and (p) adding the height increment value to the present guess value to produce another present guess value and repeating steps (e) through (j) if the height increment value is not less than the predetermined error.

9. A device for measuring a step height between a first surface area of a first material of a sample and a second surface area of a second material of the sample, comprising in combination:

(a) a stage of an interferometer, the sample being supported on the stage;

(b) means for operating the interferometer to measure the intensities of all pixels in a field of view of the interferometer including the first surface area and the second surface area;

(c) means for storing the measured intensity data;

(d) means for computing a phase and a corresponding sample surface height at each pixel of the first surface area and the second surface area;

(e) means for displaying the computed sample surface heights;

(f) means for visually identifying the first surface area from the measured surface heights as an area including pixels the measured heights of which exceed the measured heights of other pixels by a predetermined value, the other pixels being in the second surface area;

(g) means for grouping the identified heights of the first surface area separately from the identified heights of the second surface area;

(h) means for entering first and second material constants for the first and second materials, respectively, into a computer of the interferometer;

(i) means for entering a first guess value for the height difference between the first surface area and the second surface area into the computer;

(j) means for computing a phase change on reflection for the film using the first and second material constants and the first guess value;

(k) means for computing a measured height difference between the heights of the film and the substrate from the measured heights;

(l) means for computing an error from the measured height difference, the first guess value, and the computed phase change on reflection;

(m) means for computing a derivative of the error from the present guess value, a previous guess value, the present error, and a previous error;

(n) means for computing a height increment value from the present error and the derivative;

(o) means for selecting the present guess value as the thickness of the film if the height increment value is less than a predetermined error; and (p) means for adding the height increment value to the present guess value to produce another present guess value and repeating steps (e) through (j) if the height increment value is not less than the predetermined error.

* * * * *